United States Patent
Zhang et al.

(10) Patent No.: US 10,017,657 B2
(45) Date of Patent: Jul. 10, 2018

(54) BINDER COMPOSITION AND A PAINT FORMULATION MADE THEREOF

(71) Applicants: Dow Global Technologies LLC, Midland, MI (US); Rohm and Haas Company, Philadelphia, PA (US)

(72) Inventors: Shiling Zhang, Shanghai (CN); Dong Yun, Shanghai (CN); Yujiang Wang, Shanghai (CN); Caifeng Wang, Shanghai (CN); Siyuan Jiang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/502,546

(22) PCT Filed: Sep. 9, 2014

(86) PCT No.: PCT/CN2014/086127
§ 371 (c)(1),
(2) Date: Feb. 8, 2017

(87) PCT Pub. No.: WO2016/037312
PCT Pub. Date: Mar. 17, 2016

(65) Prior Publication Data
US 2017/0226364 A1    Aug. 10, 2017

(51) Int. Cl.
*C08L 5/04* (2006.01)
*C09D 125/14* (2006.01)
*C09J 125/14* (2006.01)
*C08L 25/14* (2006.01)

(52) U.S. Cl.
CPC ............ *C09D 125/14* (2013.01); *C08L 25/14* (2013.01); *C09J 125/14* (2013.01); *C08L 2205/03* (2013.01); *C08L 2205/035* (2013.01)

(58) Field of Classification Search
CPC ...... C09D 125/14; C09J 125/14; C08L 25/14; C08L 2205/03; C08L 2205/035
USPC .......................................................... 524/28
See application file for complete search history.

(56) References Cited

U.S. PATENT DOCUMENTS

| | | | | |
|---|---|---|---|---|
| 6,005,031 A | * | 12/1999 | Bremer-Masseus | C09D 7/14 524/404 |
| 2005/0056187 A1 | | 3/2005 | Podlas | |
| 2006/0157196 A1 | | 7/2006 | Koepnick et al. | |
| 2011/0236582 A1 | | 9/2011 | Scheuing et al. | |

FOREIGN PATENT DOCUMENTS

| | | |
|---|---|---|
| EP | 0424594 A1 | 5/1991 |
| EP | 505664 A1 | 9/1992 |
| EP | 1004638 A2 | 5/2000 |
| GB | 2078243 A | 1/1982 |
| JP | 2657554 B2 | 9/1997 |
| WO | 1995023197 A2 | 8/1995 |
| WO | 2000036029 A1 | 6/2000 |
| WO | 2006029407 A2 | 3/2006 |

OTHER PUBLICATIONS

International Preliminary Report on Patentability; International Application No. PCT/CN2014/086127; International Filing Date Sep. 9, 2014; dated Mar. 14, 2017; 4 pages.
International Search Report; International Application No. PCT/CN2014/086127; International Filing Date Sep. 9, 2014; dated Apr. 27, 2015; 4 pages.
Written Opinion of the International Searching Authority; International Application No. PCT/CN2017/086127; International Filing Date Sep. 9, 2014; dated Apr. 27, 2015; 3 pages.

* cited by examiner

*Primary Examiner* — Hui Chin
(74) *Attorney, Agent, or Firm* — Karl E. Stauss; Cantor Colburn LLP

(57) ABSTRACT

The present invention provides a binder composition comprising a first binder comprising by dry weight based on total dry weight of the first binder, from 5% to 98% of polymer particles, from 0.3% to 10% of a first polysaccharide, from 0.01% to 5% of a crosslinker, from 0.3% to 6% of a water-soluble metal cation, and from 0.05% to 3% of a cationic polyelectrolyte. The binder composition may further comprise a second binder comprising by dry weight based on total dry weight of the second binder, from 0.3% to 20% of the first polysaccharide, from 0.5% to 20% of a second polysaccharide. And in that case, the wet weight ratio of the first binder to the second binder is from 1:20 to 20:1. The present invention further provides a paint formulation comprising the binder composition.

20 Claims, No Drawings

BINDER COMPOSITION AND A PAINT FORMULATION MADE THEREOF

FIELD OF THE INVENTION

The present invention relates to a binder composition, in particular, a two-package binder composition. The present invention further relates to a paint formulation, in particular, a multi-color paint formulation comprising the binder composition.

INTRODUCTION

For both conventional single-color paints containing one colorant, and multi-color paints containing at least two different colorants, customers demand that the colorants are well and stably distributed and protected in the paints and at the same time such paints are suitable for conventional operation methods such as spraying, brushing and rolling.

It is therefore desired in the art for a binder composition for paint formulations. After conventional operations such as brushing, rolling, and spraying of the paint formulation, the colorants are protected in particular areas of the paint film, which brings to the paint film a special appearance desired by customers.

SUMMARY OF THE INVENTION

The present invention provides a binder composition comprising a first binder comprising by dry weight based on total dry weight of the first binder, from 5% to 98% of polymer particles, from 0.3% to 10% of a first polysaccharide, from 0.01% to 5% of a crosslinker, from 0.3% to 6% of a water-soluble metal cation, and from 0.05% to 3% of a cationic polyelectrolyte. The binder composition may further comprise a second binder comprising by dry weight based on total dry weight of the second binder, from 0.3% to 20% of the first polysaccharide, from 0.5% to 20% of a second polysaccharide. And in that case, the wet weight ratio of the first binder to the second binder is from 1:20 to 20:1.

The present invention further provides a paint formulation comprising the binder composition.

DETAILED DESCRIPTION OF THE INVENTION

The binder composition of the present invention comprises a first binder. The binder composition of the present invention also comprises a first binder and a second binder with the wet weight ratio of the first binder to the second binder being from 1:20 to 20:1, preferably from 1:10 to 10:1, and more preferably from 1:5 to 5:1.

The First Binder

The first binder of the present invention comprises by dry weight based on total dry weight of the first binder, from 5% to 98%, preferably from 10% to 80%, and more preferably from 15% to 75%, polymer particles.

The polymer particles comprise, as polymerization units, at least one $\alpha,\beta$-ethylenically unsaturated nonionic monomer that is $\alpha,\beta$-ethylenically unsaturated monomer without bearing an ionic charge between pH=1-14. Suitable examples of the $\alpha,\beta$-ethylenically unsaturated nonionic monomers include (meth)acrylic ester monomers, i.e., methacrylic ester or acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, and lauryl methacrylate; (meth)acrylonitrile; styrene and substituted styrene such as $\alpha$-methyl styrene, and vinyl toluene; butadiene; ethylene; propylene; $\alpha$-olefin such as 1-decene; vinyl esters such as vinyl acetate, vinyl butyrate, and vinyl versatate; and other vinyl monomers such as vinyl chloride and vinylidene chloride. Preferably, the $\alpha,\beta$-ethylenically unsaturated nonionic monomers are ethyl acrylate, methyl methacrylate, 2-hydroxybutyl acrylate, 2-hydroxyethyl methacrylate, 2-hydroxypropyl methacrylate, vinyl acetate, acrylonitrile, and any combination thereof.

Optionally, the polymer particles may further comprise, as polymerization units, from 0.1% to 10%, and preferably from 0.5% to 5% by dry weight based on total dry weight of the polymer particles, an ethylenically unsaturated monomer carrying at least one functional group selected from carboxyl, carboxylic anhydride, hydroxyl, amide, amino, ureido, acetoacetate, sulphonate, phosphonate, and any combination thereof. Suitable examples of these monomers are ethylenically unsaturated carboxylic or dicarboxylic acid such as acrylic or methacrylic acid, itaconic acid, and maleic acid; ethylenically unsaturated amide such as (meth)acrylamide; ethylenically unsaturated N-alkylolamide such as N-methylol(meth)acrylamide and 2-hydroxyethyl(meth)acrylamide; hydroxyalkyl ester of the carboxylic or dicarboxylic acid, such as hydroxyethyl (meth)acrylate and hydroxypropyl (meth)acrylate; amino-functional monomers such as N,N-dimethylaminoethyl methacrylate; ureido-functional monomers such as methacrylamidoethyl-2-imidazolidinone; monomers bearing acetoacetate-functional groups such as acetoacetoxyethyl methacrylate; and any combination thereof.

The first binder further comprises by dry weight based on total dry weight of the first binder, from 0.3% to 10%, preferably from 0.5% to 8%, and more preferably from 0.8% to 6%, a first polysaccharide.

The first polysaccharides are any galactomannoglycans, and include guar gum, guar derivatives such as hydroxypropyl guar and carboxymethyl hydroxypropyl guar, locust bean gum, tara gum, and any combination thereof. Preferably, the first polysaccharide is guar gum or guar derivatives.

The first binder further comprises by dry weight based on total dry weight of the first binder, from 0.01% to 5%, preferably from 0.3% to 4%, and more preferably from 0.5% to 2%, a crosslinker.

The crosslinkers can be organotianate compounds, organozirconate compounds, and any combination thereof.

The organotianate compounds include tetraalkyl titanates and titanate chelates. The tetraalkyl titanates have the formula $Ti(OR)_4$ with R being an alkyl group. Suitable examples of the tetraalkyl titanates include tetraisopropyltitanate, tetra-n-butyltitanate, tetrakis (2-ethylhexyl) titanate, diisopropyl diisosteary titanate, and any combination thereof. The titanate chelates have the following formula (I),

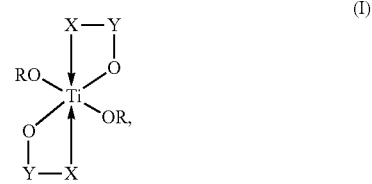

wherein X represents a functional group containing oxygen or nitrogen, Y represents a carbon chain, and R represents an alkyl group. Suitable example of the titanate chelates include acetylacetonate titanate chelate, ethyl acetoacetate titanate chelate, diisopropyl di-triethanolamino titanate chelate, lactic acid titanate chelate (ammonium salt), and any combination thereof.

The organozirconate compounds include tetraalkyl zirconates and zirconate chelates.

The tetraalkyl zirconates have the formula $Zr(OR)_4$ with R being an alkyl group. Suitable examples of the tetraalkyl zirconates include zirconium tetra-n-butanolate and zirconium tetra-n-propanolate. Suitable examples of the zirconate chelates include triethanolamine zirconate chelate, zirconium triethanolamine and polyol complex, and lactic acid zirconate chelate, and any combination thereof.

The first binder further comprises by dry weight based on total dry weight of the first binder, from 0.3% to 6%, preferably from 0.5% to 5%, and more preferably from 0.7% to 3.5%, a water-soluble metal cation.

Suitable examples of the water-soluble metal cations include calcium ions, zinc ions, aluminum ions, magnesium ions, ferric ions, barium ions, and any combination thereof.

The first binder further comprises by dry weight based on total dry weight of the first binder, from 0.05% to 3%, preferably from 0.08% to 1%, and more preferably from 0.1% to 1%, a cationic polyelectrolyte.

Suitable examples of the cationic polyelectrolytes include poly(N,N-dimethylacrylamide) (PDMA), polyamine, cationic polyacrylamide, polyamidine, polyvinylamidine, any derivatives thereof, and any combination thereof.

The Second Binder

The second binder of the present invention comprises by dry weight based on total dry weight of the second binder, from 0.3% to 20%, preferably from 1% to 16%, and more preferably from 5% to 14%, the first polysaccharide.

The second binder of the present invention further comprises by dry weight based on total dry weight of the second binder, from 0.5% to 20%, preferably from 0.8% to 15%, and more preferably from 1.0% to 10%, a second polysaccharide.

Suitable examples of the second polysaccharide include methylcellulose (MC), hydroxypropylmethylcellulose (HPMC), hydroxyethylmethylcellulose (HEMC), hydroxybutylmethylcellulose (HBMC), hydroxyethylethylcellulose (HEEC), carboxymethylcellulose (CMC), agar, starch, alginate, gellan gum, xanthan gum, pectin, carrageenan, gelatin, gum arabic, tragacanth gum, algin, any derivatives thereof, and any combination thereof. Preferably, the second polysaccharide is MC, HPMC, CMC, alginate, and any combination thereof.

Optionally, the second binder may further comprise by dry weight based on total dry weight of the second binder, from 2% to 70%, preferably from 4% to 60%, and more preferably from 5% to 50%, the polymer particles.

Optionally, the second binder may further comprise by dry weight based on total dry weight of the second binder, from 1% to 80%, preferably from 5% to 50%, and more preferably from 10% to 40%, pigment particles.

The pigment particles refer to inorganic materials which are capable of materially contributing to the opacity (or hiding capability) of a composition. Such materials typically have a refractive index of greater than 1.8, and include titanium dioxide ($TiO_2$), zinc oxide, zinc sulfide, barium sulfate, barium carbonate, and lithopone. Titanium dioxide ($TiO_2$) is preferred.

Other Optional Components in at Least One of the First and the Second Binders

Optionally, at least one of the first and the second binders of the present invention may further comprise by dry weight based on total dry weight of the binder, from 0.05% to 10%, preferably from 0.5% to 7.5%, and more preferably from 1% to 5%, clay.

The clay refers to hydrous phyllosilicates with magnesium, aluminum, lithium sodium and other metal elements. Suitable examples of the clay include lithium magnesium silicate commercially available as LAPONITE™ RD and LAPONITE RDS from Rockwood Additives Ltd., aluminum magnesium silicate commercially available as VEEGUM™ from Vanderbilt Company, Inc, and any combination thereof.

Optionally, at least one of the first and the second binders may further comprise by dry weight based on total dry weight of the binder, from 1% to 50%, preferably from 1% to 30%, and more preferably from 3% to 20%, extender particles.

The extender particles refer to inorganic materials having a refractive index of less than or equal to 1.8 and greater than 1.3, and include calcium carbonate, calcium sulfate, aluminosilicate, silicate, zeolite, mica, diatomaceous earth, $Al_2O_3$, zinc phosphate, solid or hollow glass, and ceramic beads.

Optionally, at least one of the first and the second binders may further comprise by dry weight based on total dry weight of the binder, from 0.05% to 5%, preferably from 0.1% to 3%, and more preferably from 0.2% to 2%, a thickener.

Suitable examples of the thickener include polyvinyl alcohol (PVA), alkali-soluble emulsions (ASE), hydrophobically modified alkali soluble emulsions (HASE), hydrophobically modified ethylene oxide-urethane polymers (HEUR), hydrophobically modified hydroxyethyl cellulose (HMHEC), hydrophobically modified polyacryamide, and fumed silica.

Preparation of Either Binder

Either binder of the present invention is prepared by mixing the binder components in water with stirring. Preferably, polysaccharides, polymer particles, and the binder components other than the crosslinkers, the water soluble metal ions, and the cationic polyelectrolytes were mixed first. More preferably, where the crosslinkers, the water soluble metal ions, and the cationic polyelectrolytes were used, the crosslinkers were added into the mixture after the mixing of other binder components as described above, and the water soluble metal ions were added into the mixture after the addition of the crosslinkers and before the addition of the cationic polyelectrolytes.

Preparation of the Binder Composition

The binder composition of the present invention is prepared by simply mixing the first binder and the second binder.

The Paint Formulation

The binder composition could be made into a paint formulation by mixing the binder composition with other paint additives, and from 0.01% to 20%, preferably from 0.05% to 15%, and more preferably from 0.1% to 10% by dry weight based on total dry weight of the binder composition, at least one colorant.

The colorants are organic or inorganic colorant particles, preferably inorganic colorant particles. Suitable examples of the colorant particles include carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, and organic yellow.

Suitable examples of the paint additives include coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, flowing agents, and anti-oxidants.

For single-color paints, one colorant is added, while for multi-color paints, at least two different colorants are added.

The colorant(s) may be added into the paints by mixing the colorant(s) with the first binder, the second binder, the binder composition, or the paint formulation.

Paint Operations

The paint formulations may be operated by conventional operation methods including brushing, rolling, and spraying methods such as air-atomized spray, air-assisted spray, airless spray, high volume low pressure spray, and air-assisted airless spray.

Suitable substrates for such paint operations include concrete board, cement board, medium-density fiber (MDF) board, particle board, gypsum board, wood, stone, metal, plastics, wall paper and textile. Preferably, all the substrates are pre-primed by waterborne or solvent-borne primers.

EXAMPLES

I. Raw Materials

| Ingredients | Supplier |
| --- | --- |
| JAGUAR ™ HP-8 hydroxypropyl guar (HP-8) | Solvay S.A. Company |
| JAGUAR HP-105 hydroxypropyl guar (HP-105) | Solvay S.A. Company |
| JAGUAR 4500F guar gum (4500F) | Solvay S.A. Company |
| WALOCEL ™ CRT 3000 carboxymethylcellulose (CRT 3000) | The Dow Chemical Company |
| METHOCEL ™ K 100M hydroxypropylmethylcellulose (K 100M) | The Dow Chemical Company |
| METHOCEL F 4M hydroxypropylmethylcellulose (F 4M) | The Dow Chemical Company |
| MANUCOL ™ DM alginate (DM) | FMC Company |
| HZ-200 clay (HZ-200) | Huizhi Fine Chemical Ltd. |
| XERACOLOUR ™ blue colorant | ICC International Chemical |
| XERACOLOUR red colorant | ICC International Chemical |
| PRIMAL ™ SF-155 acrylic polymer emulsion (SF-155) | The Dow Chemical Company |
| TYZOR ™ TE titanate chelate (TYZOR TE) | Dorf Ketal Company |
| TYZOR 217 lactic acid zirconate chelate (TYZOR 217) | Dorf Ketal Company |
| poly(N,N-dimethylacrylamide) (PDMA) | Sinopharm Chemical Reagent Co., Ltd. |
| ARONFLOC ™ C-510 cationic polyacrylamide (C-510) | MT AquaPolymer Inc. |
| Borate | Sinopharm Chemical Reagent Co., Ltd. |
| Calcium chloride (CaCl$_2$) | Sinopharm Chemical Reagent Co., Ltd. |
| Sodium hydroxide (NaOH) | Sinopharm Chemical Reagent Co., Ltd. |
| NOPCO NXZ defoamer (NXZ) | Nopco Inc. |
| OROTAN ™ 1288 dispersant | The Dow Chemical Company |
| KATHON ™ 287 biocide | The Dow Chemical Company |
| ACRYSOL ™ ASE-60 thickener | The Dow Chemical Company |
| CC-700 calcium carbonate (CC-700) | Qingdao Gu Dao Chemical Materials Co., Ltd. |
| TI-PURE ™ R706 TiO$_2$ (TiO$_2$) | E. I. du Pont Company |
| NATROSOL ™ 250HBR rheology modifier | Eastman Chemical Company |

II. Test Methods

1. Colorant Protection 1 g XERACOLOUR™ blue colorant was respectively added into 100 g of the first binder and 100 g of the second binder, and mixed by stirring. The mixture of binder and colorant was washed by water for colorant protection observation by naked eyes. If the binder remained colorful after the wash, the colorant was protected by the binder, otherwise, the colorant was not protected.

2. Heat Aging Test 300 mL of each paint formulation was added into a 500 mL capped plastic bottle and heated under 50° C. in a Lindberg/Blue M™ vacuum oven of Thermal Electron Corporation for 10 Days. Paint formulations were observed by naked eyes for gelation or syneresis after heat aging.

III. Experimental Examples

1. Preparation of Binder Composition Examples (Examples) 1 to 8 and Comparative Binder Composition Examples (Comparative Examples) 9 to 14

Preparation of the first binder for Example 1: 2.5 g JAGUAR HP-8 hydroxypropyl guar, 1.5 g METHOCEL K 100M hydroxypropylmethylcellulose were dispersed in 114.4 g DI water by stirring at 200-1500 rpm for 5 min, and then incubated at 60-90° C. for 10 min with stirring at 500-2000 rpm. The composition was cooled by ice water bath for 10 min, and was kept stirring at 500-2000 rpm. When the polysaccharides were dissolved, 95.8 g CC-700 calcium carbonate, 300 g PRIMAL SF-155 styrene-acrylic polymer emulsion, 1.0 g NOPCO NXZ defoamer, 1.6 g OROTAN 1288 dispersant and 1.2 g KATHON 287 biocide were added into the polysaccharide solution with stirring at 2000 rpm for 20 min 2 g TYZOR TE titanate chelate was then added with stirring at about 10-300 rpm for 5 min 0.2 g 30% NaOH solution was used to adjust pH to about 8-9 to facilitate the crosslinking reaction. After that, 80 g 5% CaCl$_2$ solution and 2 g 20% PDMA solution were added in order with stirring at 50-300 rpm for another 5 min.

Preparation of the second binder for Example 1: 4.0 g JAGUAR 4500F guar gum, 2.5 g METHOCEL K 100M hydroxypropylmethylcellulose were dispersed in 347.4 g DI water by stirring at 200-1500 rpm for 5 min, and then incubated at 60-90° C. for 10 min with stirring at 500-2000 rpm. The composition was cooled by ice water bath for 10 min, and was kept stirring at 500-2000 rpm. When the polysaccharides were dissolved, 0.5 g HZ-200 clay, 1.1 g ACRYSOL ASE-60 thickener, 26.6 g CC-700 calcium carbonate, 25 g TI-PURE R706 TiO$_2$, 50 g PRIMAL SF-155 acrylic polymer emulsion, 1.0 g NOPCO NXZ defoamer, 2.0 g OROTAN 1288 dispersant, 1.5 g KATHON™ 287 biocide were added into the polysaccharide solution with stirring at 2000 rpm for 20 min. 0.5 g TYZOR TE titanate chelate was then added with stirring at about 10-300 rpm for 5 min 0.3 g 30% NaOH solution was used to adjust pH to about 8-9 to facilitate the crosslinking reaction.

The first and the second binders for Binder Composition Examples 2 to 8 and Comparative Binder Composition Examples 9 to 14 were prepared according to the above process of preparation for the first and the second binders for Example 1, with detailed binder components listed in Table 1.

The first and the second binder of each Binder Composition Examples 1 to 8 and Comparative Binder Composition Examples 9 to 14 were mixed by stirring at 10-300 rpm for 10 min at a wet ratio as listed in Table 1 to prepare the Binder Composition Examples.

2. Preparation of Paint Formulations (Paint) 1 to 8 and Comparative Paint Formulations (Comparative Paints) 9 to 14

Preparation of Paint Formulation 1 (Paint 1) from Example 1: 50 g first binder and 50 g second binder were mixed by stirring at 10-300 rpm for 10 min. The resulted composition was dispersed in 10 g NATROSOL 250HBR rheology modifier solution (1%). Paint Formulations 2 to 8 and Comparative Paint Formulations 9 to 14 were prepared from Binder Composition Examples 2 to 8 and Comparative Paint Formulations 9 to 14, respectively, according to the above process of preparation for Paint Formulation 1.

TABLE 1 a

| | Examples | Example 1 | Example 2 | Example 3 | Example 4 |
|---|---|---|---|---|---|
| First binder (100%) | First polysaccharide | 1.0% HP-8 | 1.5% HP-105 | 3.7% HP-105 | 5.6% 4500F |
| | Second polysaccharide | 0.6% K 100M | 1.1% K 100M | 0.7% CMC | 2.2% F 4M |
| | Polymer particles | 57.6% SF-155 | 95.1% SF-155 | 92.3% SF-155 | 86.2% SF-155 |
| | Extender | 38.3% CC-700 | — | — | — |
| | Crosslinker | 0.8% TYZOR TE | 1.1% TYZOR TE | 1.8% TYZOR TE | 2.6% TYZOR 217 |
| | Metal cations | 1.5% $CaCl_2$ | 1.1% $CaCl_2$ | 1.5% $CaCl_2$ | 1.3% $CaCl_2$ |
| | Cationic polyelectrolytes | 0.2% PDMA | 0.2% PDMA | — | 2.1% C-510 |
| Second binder (100%) | First polysaccharide | 3.7% 4500F | 20.0% HP-8 | 10% HP-105 | 3.0% HP-8 |
| | Second polysaccharide | 2.3% K 100 | 5.3% CMC | — | 2.3% F 4M; 1.1% DM |
| | Crosslinker | 0.5% TYZOR TE | 2.6% TYZOR 217 | 0.6% TYZOR TE | 0.5% TYZOR 217 |
| | Polymer particles | 46.0% SF-155 | — | 37.6% SF-155 | 55.9% SF-155 |
| | Extender | 24.5% CC-700 | — | 26.7% CC-700 | — |
| | Pigment | 23.0% $TiO_2$ | 72.1% $TiO_2$ | 25.1% $TiO_2$ | 37.2% $TiO_2$ |
| Wet weight ratio of the first binder to the second binder | | 1:1 | 1:10 | 5:1 | 1:20 | b

| | Examples | Example 5 | Example 6 | Example 7 | Example 8 |
|---|---|---|---|---|---|
| First binder (100%) | First polysaccharide | 2.7% HP-8 | 3.5% HP-105 | 2.7% HP-8 | 2.7% HP-105 |
| | Second polysaccharide | — | 2.1% K 100M | 1.6% K 100M | 2.0% CMC |
| | Polymer particles | 93.8% SF-155 | 87.7% SF-155 | 82.4% SF-155 | 92.4% SF-155 |
| | Extender | — | — | 10.1% CC-700 | — |
| | Crosslinker | 2.2% TYZOR TE | 2.8% TYZOR 217 | 2.2% TYZOR TE | 1.3% TYZOR TE |
| | Metal cations | 1.1% $CaCl_2$ | 3.5% $CaCl_2$ | — | 1.3% $CaCl_2$ |
| | Cationic polyelectrolytes | 0.2% PDMA | 0.4% PDMA | 1.0% PDMA | 0.3% PDMA |
| Second binder (100%) | First polysaccharide | 7.7% HP-105 | 6.9% HP-8 | 6.9% JAGUAR 4500F | 10% HP-105 |
| | Second polysaccharide | — | 3.4% K 100M; 1.7% Alginate | 3.4% K 100M; 1.7% Alginate | — |
| | Crosslinker | 0.5% TYZOR TE | 0.9% TYZOR TE; 0.7% $CaCl_2$ | 0.9% TYZOR TE; 0.7% $CaCl_2$ | 0.6% TYZOR TE |
| | Polymer particles | 91.8% SF-155 | 42.9% SF-155 | 42.9% SF-155 | 37.6% SF-155 |
| | Extender | | 16.1% CC-700 | 16.1% CC-700 | 26.7% CC-700 |
| | Pigment | — | 27.4% $TiO_2$ | 27.4% $TiO_2$ | 25.1% $TiO_2$ |
| Wet weight ratio of first binder/second binder | | 10:1 | 1:1 | 1:7 | 5:1 | c

| | Examples | Comparative Example 9 | Comparative Example 10 | Comparative Example 11 | Comparative Example 12 |
|---|---|---|---|---|---|
| First binder (100%) | First polysaccharide | 1.5% HP-105 | 2.7% HP-8 | 2.7% HP-8 | 1.0% HP-8 |
| | Second polysaccharide | 1.1% K 100M | 2.0% CMC | — | 0.6% K 100M |

TABLE 1-continued

|  |  |  |  |  |  |
|---|---|---|---|---|---|
|  | Polymer particles | 96.3% SF-155 | 93.9% SF-155 | 93.8% SF-155 | 58.4% SF-155 |
|  | Extender | — | — | — | 38.3% CC-700 |
|  | Crosslinker | 1.1% TYZOR TE | 1.3% TYZOR TE | 2.2% borate | — |
|  | Metal cations | — | 0.1% $CaCl_2$ | 1.1% $CaCl_2$ | 1.5% $CaCl_2$ |
|  | Cationic polyelectrolytes | — | 0.02% PDMA | 0.2% PDMA | 0.2% PDMA |
| Second binder (100%) | First polysaccharide | 20.0% HP-8 | 10% HP-105 | 7.7% HP-105 | 3.7% 4500F |
|  | Second polysaccharide | 5.3% CMC | — | — | 2.3% K 100M |
|  | Crosslinker | 2.6% TYZOR 217 | 0.6% TYZOR TE | 0.5% borate | — |
|  | Polymer particles | — | 37.6% SF-155 | 91.8% SF-155 | 46.0% SF-155 |
|  | Extender | — | 26.7% CC-700 | — | 25.0% CC-700 |
|  | Pigment | 72.1% $TiO_2$ | 25.1% $TiO_2$ | — | 23.0% $TiO_2$ |
| Weight ratio of the first binder to the second binder |  | 1:1 | 1:10 | 1:10 | 1:1 | d

|  |  | Examples | Comparative Example 13 | Comparative Example 14 |
|---|---|---|---|---|
| First binder (100%) | First polysaccharide | — | 0.1% HP-8 |
|  | Second polysaccharide | 1.1% K 100M | 0.6% K 100M |
|  | Polymer particles | 96.5% SF-155 | 58.5% SF-155 |
|  | Extender | — | 38.3% CC-700 |
|  | Crosslinker | 1.1% TYZOR TE | 0.8% TYZOR TE |
|  | Metal cations | 1.1% $CaCl_2$ | 1.5% $CaCl_2$ |
|  | Cationic polyelectrolytes | 0.2% PDMA | 0.2% PDMA |
| Second binder (100%) | First polysaccharide | — | 0.1% 4500F |
|  | Second polysaccharide | 5.3% CMC | 2.3% K 100M |
|  | Crosslinker | 2.6% TYZOR TE | 0.5% TYZOR TE |
|  | Polymer particles | 20.0% SF-155 | 49.6% SF-155 |
|  | Extender | — | 24.5% CC-700 |
|  | Pigment | 72.1% $TiO_2$ | 23.0% $TiO_2$ |
| Weight ratio of the first binder and the second binder |  | 1:6 | 5:1 |

* Comparative examples

IV. Results

TABLE 2

| Examples | Colorant protection | |
|---|---|---|
|  | The first binder | The second binder |
| Example 1 | protected | not protected |
| Example 2 | protected | not protected |
| Example 3 | protected | not protected |
| Example 4 | protected | not protected |
| Example 5 | protected | not protected |
| Example 6 | protected | not protected |
| Example 7 | protected | not protected |
| Example 8 | protected | not protected |
| Comparative Example 9 | not protected | not protected |
| Comparative Example 10 | not protected | not protected |
| Comparative Example 11 | protected | not protected |
| Comparative Example 12 | not protected | not protected |
| Comparative Example 13 | not protected | not protected |
| Comparative Example 14 | not protected | not protected |

TABLE 3

| Paints | Heat aging test |
|---|---|
| Paint 1 | stable |
| Paint 2 | stable |
| Paint 3 | stable |
| Paint 4 | stable |
| Paint 5 | stable |
| Paint 6 | stable |
| Paint 7 | stable |
| Paint 8 | stable |
| Comparative Paint 9 | stable |
| Comparative Paint 10 | stable |
| Comparative Paint 11 | gelation |
| Comparative Paint 12 | — |
| Comparative Paint 13 | — |
| Comparative Paint 14 | — |

As shown in Table 1 and Table 2, Comparative Binder Composition Example 9 (Comparative Example 9), in its first binder, did not comprise the metal cations ($CaCl_2$) or the cationic polyelectrolytes (PDMA), and did not protect the colorant in its first binder. Comparative Binder Composition Example 10 (Comparative Example 10) comprised insufficient amount of the metal cations and the cationic polyelectrolytes in its first binder, and did not protect the colorant in its first binder as well. It is the requirement that the colorant was protected and only protected in the first binder for required paint appearance. For this purpose, it was supported by the data that the metal cations and the cationic polyelectrolytes were necessarily comprised in the first binder of the binder composition of the present invention.

Comparative Binder Composition Examples 11 and 12 (Comparative Examples 11 and 12) either comprised a non-recommended crosslinker (2.2% borate), or did not comprise any crosslinker in their first binders. Comparative Binder Composition Example 11 protected colorant in its first binder, but the paint made from it was gelled and was not suitable for operation. Comparative Binder Composition Example 12 did not protect colorant in its first binder. The data indicated that the crosslinker played a critical role to the performance of the binder composition of the present invention.

Comparative Binder Composition Examples 13 and 14 (Comparative Examples 13 and 14) respectively comprised no first polysaccharide and insufficient amount of the first polysaccharide in their first binders, and both of their first binders did not protect the colorant. The data indicated that the first polysaccharide component and its percentage were critical to the colorant protection of the first binder.

Binder Composition Examples 1 to 8 comprised respectively proper amounts of recommended components of the present invention, and showed required colorant protections and paint stabilities.

What is claimed is:

1. A binder composition comprising a first binder comprising by dry weight based on total dry weight of the first binder, from 5% to 98% of polymer particles, from 0.3% to 10% of a first polysaccharide, from 0.01% to 5% of a crosslinker, from 0.3% to 6% of a water-soluble metal cation, and from 0.05% to 3% of a cationic polyelectrolyte.

2. The binder composition according to claim 1 wherein the polymer particles further comprises by dry weight based on total dry weight of the polymer particles, from 0.1% to 10% of an ethylenically unsaturated monomer carrying at least one functional group.

3. The binder composition according to claim 1 wherein the first polysaccharide is selected from guar gum and guar derivatives.

4. The binder composition according to claim 1 wherein the crosslinker is selected from organotitanate compounds, organozirconate compounds, and any combination thereof.

5. The binder composition according to claim 1 wherein the water-soluble metal cations are selected from calcium ions, zinc ions, aluminum ions, magnesium ions, ferric ions, barium ions, and any combination thereof.

6. The binder composition according to claim 1 wherein the cationic polyelectrolytes are selected from poly(N,N-dimethylacrylamide), polyamine, cationic polyacrylamide, polyamidine, polyvinylamidine, any derivatives thereof, and any combination thereof.

7. The binder composition according to claim 1 further comprising a second binder comprising by dry weight based on total dry weight of the second binder, from 0.3% to 20% of the first polysaccharide and from 0.5% to 20% of a second polysaccharide.

8. The binder composition according to claim 7 wherein the wet weight ratio of the first binder to the second binder is from 1:20 to 20:1.

9. The binder composition according to claim 7 wherein the second polysaccharide is selected from methylcellulose, hydroxypropylmethylcellulose, carboxymethylcellulose, alginate, and any combination thereof.

10. The binder composition according to claim 7 wherein the second binder further comprises by dry weight based on total dry weight of the second binder, from 1% to 80% of pigment particles.

11. The binder composition according to claim 1 wherein the first binder further comprises by dry weight based on total dry weight of the first binder, from 0.05% to 10% of clay.

12. The binder composition according to claim 1 wherein the first binder further comprises by dry weight based on total dry weight of the first binder, from 1% to 50% of extender particles.

13. The binder composition according to claim 1 wherein the first binder further comprises by dry weight based on total dry weight of the first binder, from 0.05% to 5% of a thickener.

14. The binder composition according to claim 1 further comprising by dry weight based on total dry weight of the binder composition, from 0.01% to 20% of at least one colorant.

15. A paint formulation comprising the binder composition of claim 1.

16. The binder composition according to claim 7 wherein at least one of the first binder and the second binder further comprises by dry weight based on total dry weight of the binder, from 0.05% to 10% of clay.

17. The binder composition according to claim 7 wherein at least one of the first binder and the second binder further comprises by dry weight based on total dry weight of the binder, from 1% to 50% of extender particles.

18. The binder composition according to claim 7 wherein at least one of the first binder and the second binder further comprises by dry weight based on total dry weight of the binder, from 0.05% to 5% of a thickener.

19. The binder composition according to claim 7 further comprising by dry weight based on total dry weight of the binder composition, from 0.01% to 20% of at least one colorant.

20. A paint formulation comprising the binder composition of claim 7.

* * * * *